United States Patent [19]
Criscione

[11] Patent Number: 5,618,073
[45] Date of Patent: Apr. 8, 1997

[54] AUTOMOBILE REAR BUMPER PROTECTOR

[76] Inventor: Steven Criscione, 7520 Ridge Blvd., Apt. 1-B, Brooklyn, N.Y. 11209

[21] Appl. No.: 369,771

[22] Filed: Jan. 6, 1995

[51] Int. Cl.⁶ .................................................. B60R 19/44
[52] U.S. Cl. .......................... 293/142; 296/136; 280/770
[58] Field of Search .......................... 296/136; 293/117, 293/142, 143; 150/166; 24/306, 442; 280/770

[56] References Cited

U.S. PATENT DOCUMENTS

| | | | |
|---|---|---|---|
| 1,486,660 | 3/1924 | Hajdu . | |
| 2,758,866 | 8/1956 | Dollar | 293/143 |
| 3,902,752 | 9/1975 | Pelletier | 296/91 |
| 4,219,218 | 8/1980 | Waldon | 280/770 |
| 4,274,667 | 6/1981 | Dietmar | 293/102 |
| 4,376,546 | 3/1983 | Guccione et al. | 280/770 |
| 4,493,502 | 1/1985 | Campbell, Jr. | 280/770 |
| 4,589,459 | 5/1986 | Lantrip | 296/136 |
| 4,635,996 | 1/1987 | Hirose | 296/136 |
| 4,997,229 | 3/1991 | Swanson | 296/136 |
| 5,042,836 | 8/1991 | Swanson | 280/770 |
| 5,056,817 | 10/1991 | Fuller | 280/770 |
| 5,129,678 | 7/1992 | Gurbacki | 280/770 |
| 5,158,324 | 10/1992 | Flesher | 280/770 |
| 5,280,989 | 1/1994 | Castillo | 296/136 |

FOREIGN PATENT DOCUMENTS 2178795  2/1987  United Kingdom ..................... 24/442

*Primary Examiner*—Dennis H. Pedder
*Attorney, Agent, or Firm*—Morgan & Finnegan, L.L.P.

[57] ABSTRACT

A protective cover for covering the outer surface of a rear bumper of a motor vehicle. The protective cover may consist of a single panel of flexible material, or, alternatively, two panels of flexible material and a central portion formed from a transparent polymer that provides visual access to a rear license plate that may be located in a recess formed in the rear bumper. The protective cover is secured in place across the rear bumper by straps that are looped through attachment handles affixed to the motor vehicle's rear wheel.

5 Claims, 3 Drawing Sheets

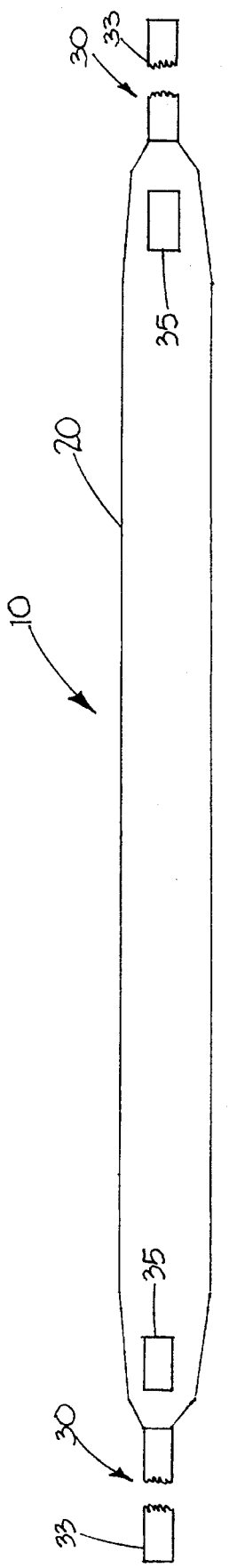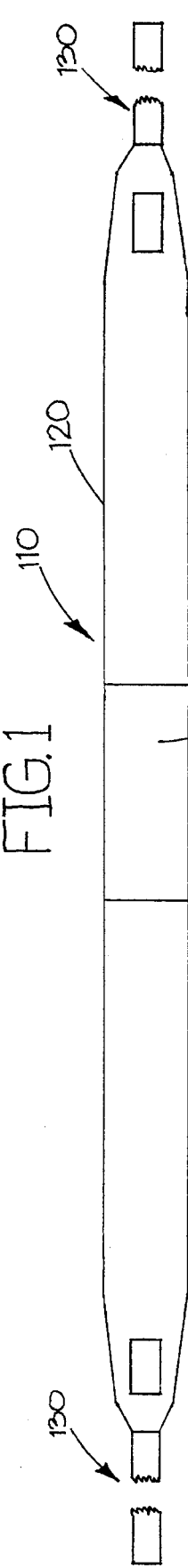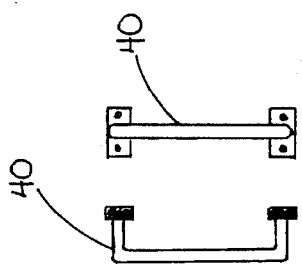

AUTOMOBILE REAR BUMPER PROTECTOR

FIELD OF THE INVENTION

This invention relates to protective covers for the rear bumper of motor vehicles.

BACKGROUND OF THE INVENTION

Protective covers for selected front portions of a motor vehicle body, such as the front fenders, engine hood, front bumper area including any grill work and/or retractable headlamp housings are well known in the art, and are commonly referred to as "bras". The purpose of these bras is to protect the paint of the front portions of a motor vehicle from damage due to oncoming stones, flying particles, insects and similar damaging materials when driving, particularly at higher speeds. Such bras are disclosed in, for example, Waldon U.S. Pat. No. 4,219,218 issued Aug. 26, 1980, Guccione et al. U.S. Pat. No. 4,376,546 issued Mar. 15, 1983, and Swanson U.S. Pat. No. 4,997,229 issued Mar. 5, 1991.

The rear bumpers of today's motor vehicles are typically formed from molded plastic and are painted the same color as the remainder of the body. Such a rear bumper is not at risk of damage from oncoming stones, flying particles and the like when the vehicle is driven. However, the rear bumper is at risk of minor damage such as scratches, chips and abrasions when the vehicle is parked as a result of a low speed impact by another motor vehicle, a shopping cart or any other moving object.

There is, therefore, a need for a new protective cover for the rear bumper of motor vehicles.

In general, it is an object of the present invention to provide a protective cover for the rear bumper of a motor vehicle that protects the rear bumper from minor damages, such as scratches, chips and abrasions, resulting from a low speed impact by a moving object that does not violate the structural integrity of the rear bumper.

SUMMARY OF THE INVENTION

The present invention provides a protective cover for the rear bumper of a motor vehicle. In one embodiment, the protective cover comprises a single covering panel of flexible material that conforms to the size and shape of the rear bumper, and two securing straps affixed to the side ends of the covering panel. The straps facilitate the securement of the protective cover to the body of the motor vehicle so that the cover panel is maintained in position across the outer surface of the rear bumper while the motor vehicle is driven or parked. The protective cover is secured to the body of the motor vehicle by looping the free end portion of each securing strap through an attachment handle affixed to the rear wheel well and then fastening the free end portion, under tension, to the covering panel.

In an alternative embodiment, the covering panel has a centrally disposed portion formed from a transparent polymer that provides visual access to a rear license plate that may be disposed in a recess formed in the rear bumper.

BRIEF DESCRIPTION OF THE DRAWINGS

The invention will be further described, by way of example, with reference to the accompanying drawings, wherein:

FIG. 1 is a top elevation view of one embodiment of the protective cover of the invention.

FIG. 2 is a top elevation view of an alternative embodiment of the protective cover of the invention.

FIG. 3 is a side view of an attachment handle for securing the protective cover in place over the rear bumper.

FIG. 4 is a front view of the attachment handle for securing the protective cover in place over the rear bumper.

DETAILED DESCRIPTION OF THE PREFERRED EMBODIMENTS

Figure 6:
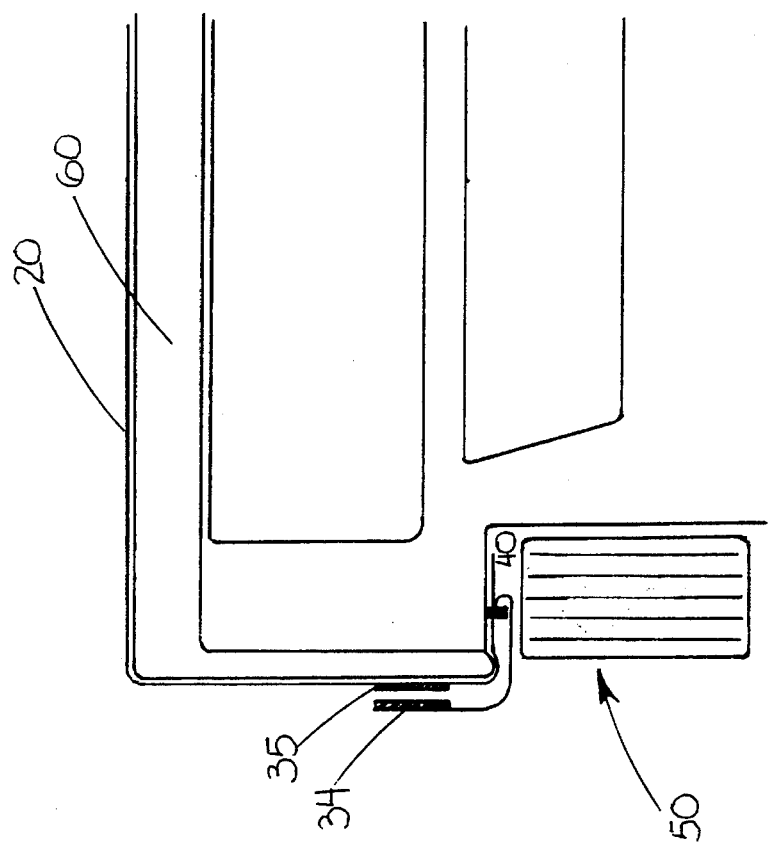
FIG. 6 is a top view of the protective cover of the invention in position relative to the rear bumper.

The structure of a rear bumper of a motor vehicle may be categorized as being one of two general types. The first general structural type comprises a molded plastic portion with a uniform outer surface that extends across the rear of the motor vehicle and may wrap around the rear sides of the vehicle to extend to about the rear wheel wells. In this structural type, the rear license plate is disposed above the rear bumper. The second general structural type comprises a molded plastic portion identical to the rear bumper of the first general structural type except that a recess is formed in the central portion of the rear bumper for receiving the rear license plate.

FIG. 1 illustrates a protective cover 10 for use with a rear bumper of the first general structural type. In use, the protective cover 10 lies across the outer surface of the rear bumper and is secured in place. The protective cover 10 comprises a covering portion 20 for covering the outer surface of the rear bumper, and a securing portion 30 for securing the protective cover 10 to the body of the motor vehicle so as to maintain the covering portion 20 in position relative to the outer surface of the rear bumper while the motor vehicle is driven.

The dimensions of the rear bumper vary between different makes and models of motor vehicles. The covering portion 20 is sized to correspond to the dimensions of the rear bumper of the specific motor vehicle. The covering portion 20 is to be formed from a flexible material so that the covering portion 20 will conform to the outer surface of the rear bumper. Preferably, the covering portion 20 is formed from the same material as the well-known front "bras", i.e., a composite material comprising a water-proof outer layer formed from a vinyl material and a non-abrasive inner layer which faces the outer finished surface of the rear bumper.

In order to maintain the covering portion 20 in position across the outer surface of the rear bumper, the protective cover 10 is to be secured to the body of the motor vehicle. Since it may be desirable to remove the covering portion 20 from the rear bumper on occasion, the protective covering 10 is preferably readily detachably secured to the body of the motor vehicle.

The securing portion 30 comprises two elongated securing straps 33 preferably formed from VELCRO™ material, one of which is affixed to each side end of the covering portion 20, and two fastening pads 35 formed from mating VELCRO™ material that are affixed to the outer surface of the covering portion near the side ends thereof. An attachment handle 40, as shown in FIGS. 3–6, is affixed to the body of the motor vehicle at the rear portion of each rear wheel well 50 in a conventional manner such as by sheet metal screws.

Figure 5:
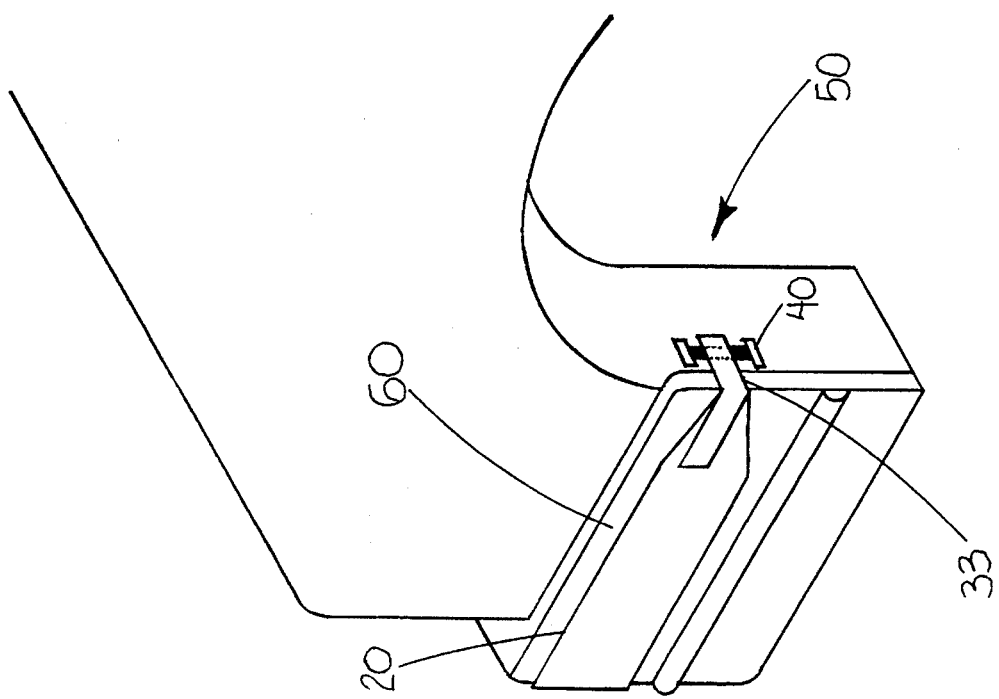
FIG. 5 is a perspective view of the attachment handle affixed to a rear wheel well of a motor vehicle and the protective cover secured in place over the rear bumper.
Figure 7:
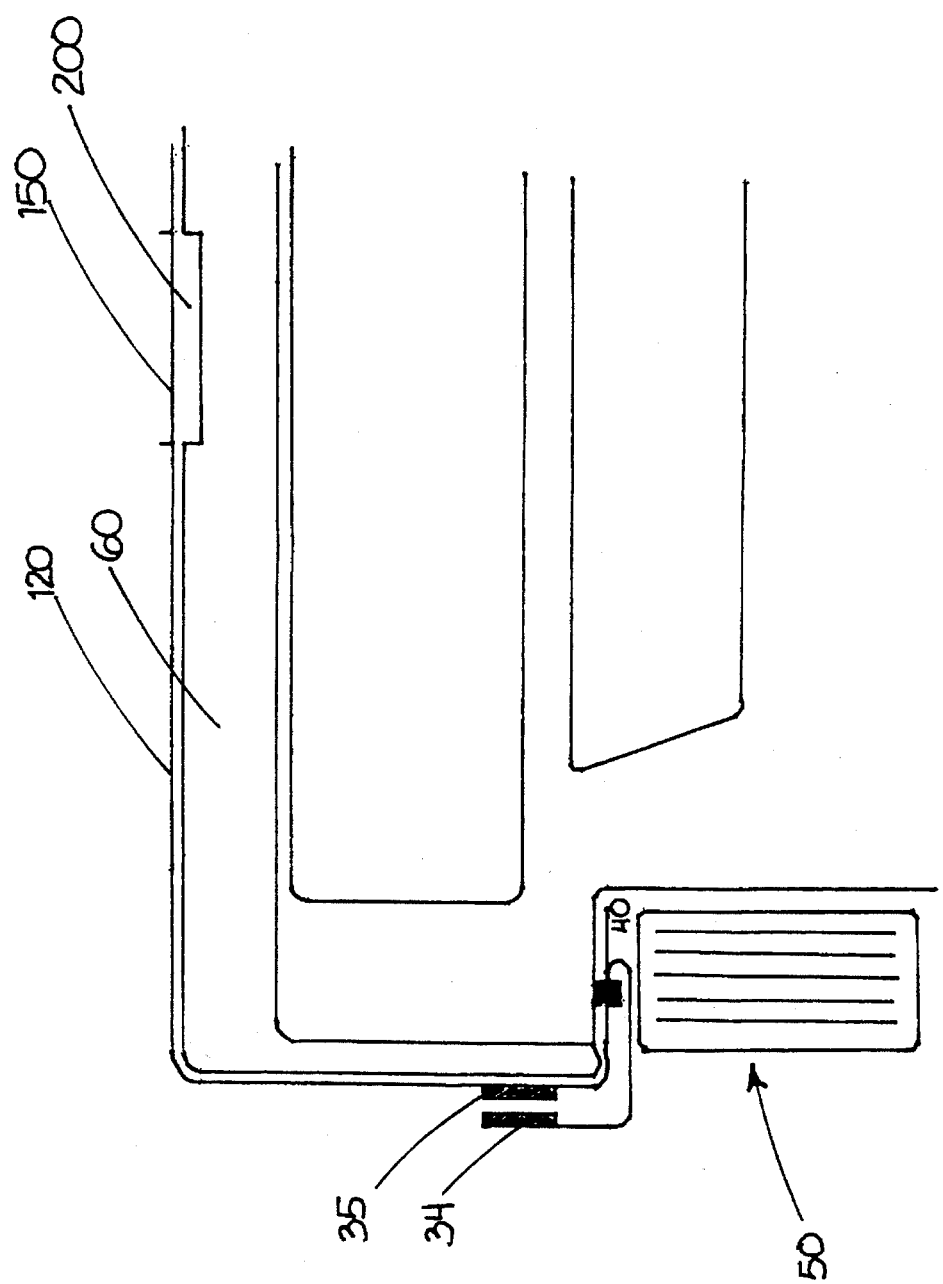
FIG. 7 is a top view of an alternative embodiment of the protective cover of the invention in position relative to a rear bumper having a license plate receptacle.

Referring to FIGS. 5 and 6, the protective cover 10 is installed by positioning the covering portion 20 across the rear bumper 60, inserting and looping the free end portion 34 of each elongated securing strap 33 through the attachment handles 40 affixed to the rear wheel well, and then engaging the free end portion 34 of the elongated securing straps 33 with the fastening pads 35. By tensioning the elongated straps, the covering portion 20 is maintained in position relative to the rear bumper 60. This structure for securing the protective cover 10 to the body of the motor vehicle does not violate the structural integrity of the rear bumper 60, i.e., no drill holes.

The elongated straps 33 and fastening pads 35 may take other matingly engageable forms such as a belt and buckle, mating snap fasteners or the like.

The above-described embodiment should not be used with a rear bumper having a receptacle 200 formed in the center thereof for receiving the rear license plate because the covering portion 20 would cover the rear license plate. The alternative embodiment, protective cover 110 as illustrated in FIG. 2, should be used with such a rear bumper.

The protective cover 110 has two covering portions 120 which are disposed on either side of a centrally located viewing portion 150, and a securing portion 130. The structure and function of covering portion 120 and securing portion 130 correspond to that previously discussed with respect to covering portion 20 and securing portion 30.

The viewing portion 150 is formed from a transparent polymer material, preferably clear vinyl. The dimensions of the view portion 150 correspond to the dimensions of the rear license plate so that the rear license plate remains visible during use of the protective cover 110. The covering portions 120 are affixed to the side edges of the viewing portion 150 in any conventional manner.

The protective cover 110 is installed and detachably secured to the body of the motor vehicle in the same manner as described above with respect to the protective cover 10.

While the embodiments described above illustrate the invention, it is to be understood that the invention is not limited to those particular forms, and that in light of the present disclosure, those skilled in the art will recognize various changes which may be made without department from the legal scope of the invention as particularly pointed out and distinctly claimed in the appended claims.

What is claimed is:

1. A protective cover arrangement for covering the outer surface of a rear bumper of a motor vehicle which has two rear wheel wells and the length of said rear bumper extending from about one rear wheel well to about the other rear wheel well, said protective cover comprising:

a covering panel having an outer surface and an inner surface, formed from a flexible material of a size and shape conformable to said outer surface of said rear bumper, said covering panel extending the entire length of said rear bumper; and a securing means for securing said protective cover to said motor vehicle at each of said rear wheel wells so that said covering panel covers said outer surface of said rear bumper.

2. The protective cover arrangement of claim 1 wherein said securing means comprises two attachment handles, each of which is affixed to a rear wheel well of said motor vehicle, a plurality of elongated securing straps affixed to said covering panel each having one end integral with said covering panel and a second free end slidably received by one of said attachment handles, and a plurality of fasteners disposed on said outer surface of said covering panel which securingly engages said free end portion of said elongated securing straps.

3. A protective cover arrangement for covering the outer surface of a rear bumper of a motor vehicle which has two rear wheel wells and an attachment handle affixed to each rear wheel well and the length of said rear bumper extending from about one rear wheel well to about the other rear wheel well, said protective cover comprising:

a covering panel having an outer surface and an inner surface, formed from a flexible material of a size and shape conformable to said outer surface of said rear bumper, said covering panel extending the entire length of said rear bumper;

a plurality of elongated securing straps, each of said securing straps having one end integral with said covering panel and a free end that is slidably received by said attachment handle; and a plurality of fasteners disposed on said outer surface of said covering panel which securingly engage said free end portion of said elongated securing straps.

4. A protective cover arrangement for covering the outer surface of a rear bumper of a motor vehicle with two rear wheel wells that has a receptacle centrally disposed in said rear bumper for receiving a rear license plate and the length of said rear bumper extending from about one rear wheel well to about the other rear wheel well, said protective cover comprising:

a viewing panel formed from a transparent material, said viewing panel of rectangular shape dimensioned to correspond to the dimensions of said rear license plate;

two covering panels having an outer surface and an inner surface, formed from a flexible material of a size and shape conformable to said outer surface of the rear bumper exclusive of said centrally disposed receptacle, said covering panels affixed to opposite sides of said viewing panel and said covering panels extending over the entire length of said rear bumper exclusive of said centrally disposed receptacle; and securing means for securing said protective cover to said motor vehicle at each of said rear wheel wells so that said covering panels and viewing panel are retained in position across said rear bumper and said rear license plate.

5. The protective cover arrangement of claim 4 wherein said securing means comprises two attachment handles, each of which is affixed to a rear wheel well of said motor vehicle, a plurality of elongated securing straps at least one of said securing straps is affixed to each one of said covering panels each having one end integral with said covering panel and a second free end slidably received by one of said attachment handles, and a plurality of fasteners disposed on said outer surface of said covering panel which securingly engage said free end portion of said elongated securing straps.

\* \* \* \* \*